(12) United States Patent
Tiruveedhula et al.

(10) Patent No.: US 9,935,783 B2
(45) Date of Patent: Apr. 3, 2018

(54) SYSTEM FOR AVOIDING TRAFFIC FLOODING DUE TO ASYMMETRIC MAC LEARNING AND ACHIEVING PREDICTABLE CONVERGENCE FOR PBB-EVPN ACTIVE-ACTIVE REDUNDANCY

(71) Applicant: Juniper Networks, Inc, Sunnyvale, CA (US)

(72) Inventors: Maruthi Kishore Tiruveedhula, Nashua, NH (US); Tapraj Singh, San Ramon, CA (US); Sunesh Rustagi, San Jose, CA (US); Arijit Paul, Cupertino, CA (US); Vikas Vidyalal Patel, San Jose, CA (US); Himanshu Agarwal, Bangalore (IN); Suneel Kumar Pentala, Santa Clara, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 146 days.

(21) Appl. No.: 15/060,365

(22) Filed: Mar. 3, 2016

(65) Prior Publication Data
US 2017/0201389 A1    Jul. 13, 2017

(30) Foreign Application Priority Data
Jan. 7, 2016  (IN) .............................. 201641000591

(51) Int. Cl.
*H04L 12/18*    (2006.01)
*H04L 12/751*   (2013.01)
(Continued)

(52) U.S. Cl.
CPC .......... *H04L 12/1886* (2013.01); *H04L 45/02* (2013.01); *H04L 45/08* (2013.01);
(Continued)

(58) Field of Classification Search
CPC . H04L 12/1886; H04L 61/6022; H04L 45/02; H04L 61/2069; H04L 45/745; H04L 45/08; H04L 45/66
See application file for complete search history.

(56) References Cited

U.S. PATENT DOCUMENTS

| 8,223,668 B2* | 7/2012 | Allan | H04L 12/462 370/254 |
| 9,369,549 B2* | 6/2016 | Allan | H04L 45/66 |
| 9,559,951 B1* | 1/2017 | Sajassi | H04L 45/66 |

OTHER PUBLICATIONS

Extended European Search Report from counterpart European Application No. 17150432.7, dated May 23, 2017, 10 pp.
(Continued)

*Primary Examiner* — Thai Nguyen
(74) *Attorney, Agent, or Firm* — Shumaker & Sieffert, P.A.

(57) ABSTRACT

In one example, a method includes performing L2 learning of a C-MAC address included in a first L2 data message by a first provider edge (PE) router included in an Ethernet Segment of a Provider-Backbone Bridging Ethernet Virtual Private Network (PBB-EVPN); sending to a second PE router within the Ethernet Segment an L2 control message comprising the C-MAC address and a B-MAC address corresponding to the Ethernet Segment of the PBB-EVPN, wherein the L2 control message informs the second PE router of the reachability of the C-MAC address through the first PE router; receiving, by the first PE router and from the second PE router, a second L2 data message as unicast traffic destined for the C-MAC address; and forwarding the second L2 data message to the first CE router.

20 Claims, 5 Drawing Sheets

(51) Int. Cl.
  *H04L 12/741* (2013.01)
  *H04L 12/721* (2013.01)
  *H04L 29/12* (2006.01)

(52) U.S. Cl.
  CPC ............ *H04L 45/66* (2013.01); *H04L 45/745* (2013.01); *H04L 61/2069* (2013.01); *H04L 61/6022* (2013.01)

(56) References Cited

OTHER PUBLICATIONS

Sajassi, et al., "EVPN Virtual Ethernet Segment draft-sajassi-bess-evpn-virtual-eth-segment-01," Internet Working Group, Internet Draft, Jul. 6, 2015, 22 pp.

Sajassi, et al., "BGP MPLS-Based Ethernet VPN," Internet Engineering Task Force (IETF), RFC 7432, Feb. 2015, 56 pp.

Sajassi et al., "Provider Backbone Bridging Combined with Ethernet VPN (PBB-EVPN)," RFC 7623, Internet Engineering Task Force (IETF), Sep. 2015, 23 pp.

Sajassi et al., "Provider Backbone Bridging Combined with Ethernet VPN (PBB-EVPN)," draft-ietf-l2vpn-pbb-evpn-10, Internet Working Group Internet Draft, May 14, 2015, 21 pp.

Sajassi et al., "BGP MPLS Based Ethernet VPN," draft-ieff-l2vpn-evpn-11, Network Working Group Internet Draft, Oct. 18, 2014, 52 pp.

"Ethernet VPN (EVPN) and Provider Backbone Bridging-EVPN: Next Generation Solutions for MPLS-based Ethernet Services," Cisco Systems, Inc., May 2014, 10 pp.

IEEE, 802.1Q Standard, "IEEE Standard for Local and Metropolitan Area Networks—Media Access Control (MAC) Bridges and Virtual Bridged Local Area Networks, Clauses 25 and 26," May 16, 2011, 49 pp.

Response to Extended Search Report dated May 23, 2017, from counterpart European Application No. 17150432.7, filed Jan. 11, 2018, 23 pp.

* cited by examiner

| RD 501 | ESI 502 | Ethernet Tag ID 503 | MAC Addr Len 504 | MAC Addr 505 | IP Addr Len 506 | IP Addr 507 | MPLS1 508 | MPLS2 509 |

| OP 510 | ISID 512 | ESI List 514 | B-MAC 516 | C-MAC 518 |

Extended Community for a B-MAC Route 500

FIG. 5

SYSTEM FOR AVOIDING TRAFFIC FLOODING DUE TO ASYMMETRIC MAC LEARNING AND ACHIEVING PREDICTABLE CONVERGENCE FOR PBB-EVPN ACTIVE-ACTIVE REDUNDANCY

This application claims the benefit of India Patent Application 201641000591, filed Jan. 7, 2016, the entire contents of which are hereby incorporated by reference.

TECHNICAL FIELD

This disclosure generally relates to computer networks and, more specifically, to forwarding network traffic within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) (also referred to as pseudowires) within the provider network to carry encapsulated L2 communications as if these customer networks were directly attached to the same local area network (LAN). In some configurations, the PE network devices may also be connected by Internet Protocol (IP) infrastructure in which case IP/Generic Routing Encapsulation (GRE) tunneling or other IP tunneling can be used between the network devices.

EVPN may be combined with Provider Backbone Bridging (PBB) defined in accordance with IEEE standard 802.1ah. PBB defines an architecture and bridging protocols in which a Provider Backbone Bridged Network (PBBN) provides L2 connectivity between multiple provider bridge networks (PBNs) of one or more different network service providers. Such large area L2 network connectivity is being deployed, for example, in metropolitan area networks. Each PBN provides one or more service virtual LANs ("S-VLANS) to service and isolate L2 traffic from customer networks. Access switches for the PBBN typically include a set of Backbone Edge Bridges (BEBs) that interconnect some or all of the S-VLANs supported by multiple PBNs. Each BEB provides interfaces that further encapsulate L2 frames for transport through the PBBN. The VLANs used to encapsulate L2 frames from the PBNs and transport the L2 traffic through the PBBN are known as backbone VLANs (B-VLANs), and the resources that support those VLANs are usually considered to be part of the PBBN. In this way, the PBBN may be referred to as a Virtual Bridged Local Area Network under the administrative control of a backbone provider. PBB-EVPN combines functionality of an EVPN and PBB BEB bridge, such that Multi-Protocol Label Switching (MPLS) LSPs defined in an EVPN are mapped to PBB encapsulated traffic.

In EVPN, a customer Media Access Control (C-MAC) address learned by one of the PE routers is advertised in BGP to all other PE routers in that EVPN instance. Thus, all the PE network devices within the EVPN are exposed to, and must store, all the C-MAC addresses learned by any one of these PE network devices. This is the case even if some of the PE routers for that EVPN instance are not involved in forwarding traffic to, or from, these C-MAC addresses. Even if an implementation does not install hardware forwarding entries for C-MAC addresses that are not part of active traffic flows on that PE, the device memory is still consumed by keeping record of the C-MAC addresses in the routing table (RIB). In network applications with millions of C-MAC addresses, this introduces a non-trivial waste of PE resources. As such, Provider Backbone Bridging (PBB)-EVPN was introduced to confine the scope of visibility of C-MAC addresses only to those PE routers that are actively involved in forwarding traffic to, or from, these addresses.

In PBB-EVPN, IEEE Backbone Edge Bridge (BEB) functionality is incorporated into the EVPN PE routers. MAC tunneling (MAC-in-MAC) is employed to improve service instance and MAC address scalability in Ethernet. Using PBB's MAC-in-MAC encapsulation, PBB-EVPN separates customer MAC addresses (C-MACs) from backbone MAC addresses (B-MACs). In contrast to E-VPN, PE network devices in a PBB-EVPN use the Border Gateway Protocol (BGP) to advertise B-MAC reachability, but still use data-plane learning for remote C-MAC to remote B-MAC binding. Thus, in a PBB-EVPN, a PE network device receives Ethernet frames from a CE network device, encapsulates them in a PBB header containing one or more B-MAC addresses, and forwards the frames over an IP/MPLS core. On the egress EVPN PE network device, the PBB header is removed following the MPLS disposition, and the original Ethernet frame is delivered to the destination CE network device. As a result, the number of MAC addresses stored by each PE router may be reduced to the number C-MAC address directly connected to the PE routers of one Ethernet Segment. This number is typically much smaller than the number of C-MAC addresses that each PE router in an EVPN must store. Additional examples of PBB-EVPN implementation is described within "Provider Backbone Bridging Combined with Ethernet VPN (PBB-EVPN)," RFC7623, Internet Engineering Task Force (IETF), September, 2015, the entire contents of which is incorporated herein by reference.

In an EVPN configuration referred to as all-active mode, an Ethernet segment includes multiple PE network devices that provide multi-homed connectivity for a first customer network that includes one or more local customer devices. However, where a first PE of the multiple PE network devices is single-homed to a second customer network and at least a second PE is remote from the second customer network, inefficiencies may arise. Because the second PE router is remote from the second customer network, it may never learn C-MAC addresses for customer devices on the second customer network. Thus, it must issue Broadcast, Unknown Unicast, and Multicast (BUM) traffic to every device on the network to forward any messages received that are destined for customer devices on the second customer network. This occurs even if the customer device is reachable from the first PE router on the same Ethernet segment.

SUMMARY

In general, the disclosure describes techniques for avoiding traffic flooding due to asymmetric MAC learning within a PBB-EVPN Active-Active Ethernet Segment. The techniques described herein enable a particular PE router included in an Ethernet segment of a PBB-EVPN to send an extended community for a B-MAC route by BGP to remote PE routers on the same Ethernet segment to inform them of the reachability of a particular C-MAC address through the PE router. The techniques described herein may provide a control plane solution for C-MAC address reachability at remote PE routers for an Active-Active Ethernet segment. Accordingly, because all multi-homed remote PE routers may learn the reachability of the C-MAC address through the local PE router, flooding may be avoided for multi-homed load balanced traffic.

For example, in a PBB-EVPN having a first CE network single-homed to a first PE router and a second CE network multi-homed to the first PE router and a second PE router, wherein the first and second PE routers are within the same Ethernet segment and the second PE router is remote from the first CE network, asymmetries in MAC learning may occur between the first and second PE routers. In conventional devices, each PE router may learn the C-MAC for a client device only through its data plane. This may increase BUM traffic within the network.

Suppose a first client device on the first CE network desires to communicate with a second client device on the second client network. The first client device may transmit a message to a first CE router, which forwards the message to the first PE router. The first PE router may learn the C-MAC of the first client device through its data plane and forward the message to a second CE router on the second client network for forwarding to the second client device. If the second client device responds, the second CE router on the second client network may load balance the message between the first and second PE routers. If the first PE router receives the message, it may transmit unicast traffic directly to the first CE router on the first client network because the first PE router has learned the C-MAC address of the first client device. However, the second PE router, because it is remote from the first client network, may never learn the C-MAC address of the first client device. Thus, each time a message destined for the first client device is load-balanced to the second PE router, the second PE router must forward the message as BUM traffic to all known PE and CE routers on the network. This remains true even though the first client device is reachable through the first PE router on the same Ethernet segment as the second PE router. Thus, conventional devices waste valuable network resources issuing these types of communications as BUM traffic, where a more efficient network scheme is desired.

According to the techniques of this disclosure, when the first PE router learns a C-MAC address for a first client device, it may send an extended community for a B-MAC route to the second PE router via BGP to inform the second PE router of the reachability of the C-MAC address through the first PE router. Thus, the second PE router, upon receiving a message destined for the first client device, may transmit unicast traffic to the first PE router instead of issuing the message as BUM traffic to all devices on the network, as is done by conventional devices. Thus, a system according to the techniques of the disclosure may reduce the amount of BUM traffic flooding that occurs on a PBB-EVPN and may cause more efficient use of network resources.

In one example, this disclosure describes a method that includes: in response to receiving a first layer two (L2) data message, by a first provider edge (PE) router included in an Ethernet segment of a Provider-Backbone Bridging Ethernet Virtual Private Network (PBB-EVPN) and from a first customer edge (CE) router, performing L2 learning of a Customer MAC (C-MAC) address included in the first L2 data message; sending, by the first PE router and to at least one other PE router included in the Ethernet segment, an L2 control message, the L2 control message including the C-MAC address and a first Bridging MAC (B-MAC) address that is not configured at the at least one other PE router, the L2 control message causing the at least one other PE router to learn the reachability of the C-MAC address through the first B-MAC address of the first PE router based at least in part on the first PE router and the at least one other PE router each being configured for a second B-MAC address associated with the Ethernet segment; and in response to receiving, by the first PE router and from the at least one other PE router in the Ethernet segment, a second L2 data message as unicast traffic that includes the C-MAC address, forwarding the second L2 data message to the first CE router.

In another example, this disclosure describes a first provider edge (PE) router of a Provider Backbone Bridging (PBB) Ethernet Virtual Private Network (EVPN), where the first router includes: a control unit having at least one processor coupled to a memory, wherein the control unit executes software configured to: in response to receiving a first layer two (L2) data message from a first customer edge (CE) router, perform L2 learning of a Customer MAC (C-MAC) address included in the first L2 data message; send to at least one other PE router included in the Ethernet segment, an L2 control message, the L2 control message including the C-MAC address and a first Bridging MAC (B-MAC) address that is not configured at the at least one other PE router, the L2 control message causing the at least one other PE router to learn the reachability of the C-MAC address through the first B-MAC address of the first PE router based at least in part on the first PE router and the at least one other PE router each being configured for a second B-MAC address associated with the Ethernet segment; and in response to receiving from the at least one other PE router in the Ethernet segment, a second L2 data message as unicast traffic that includes the C-MAC address, forward the second L2 data message to the first CE router.

In another example, this disclosure describes a computer-readable medium that includes instructions for causing at least one programmable processor of a first provider edge (PE) router of a Provider Backbone Bridging (PBB) Ethernet Virtual Private Network (EVPN) to: in response to receiving a first layer two (L2) data message from a first customer edge (CE) router, perform L2 learning of a Customer MAC (C-MAC) address included in the first L2 data message; send to at least one other PE router included in the Ethernet segment, an L2 control message, the L2 control message including the C-MAC address and a first Bridging MAC (B-MAC) address that is not configured at the at least one other PE router, the L2 control message causing the at least one other PE router to learn the reachability of the C-MAC address through the first B-MAC address of the first PE router based at least in part on the first PE router and the at least one other PE router each being configured for a second B-MAC address associated with the Ethernet segment; and in response to receiving from the at least one other PE router in the Ethernet segment, a second L2 data message as unicast traffic that includes the C-MAC address, forward the second L2 data message to the first CE router.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
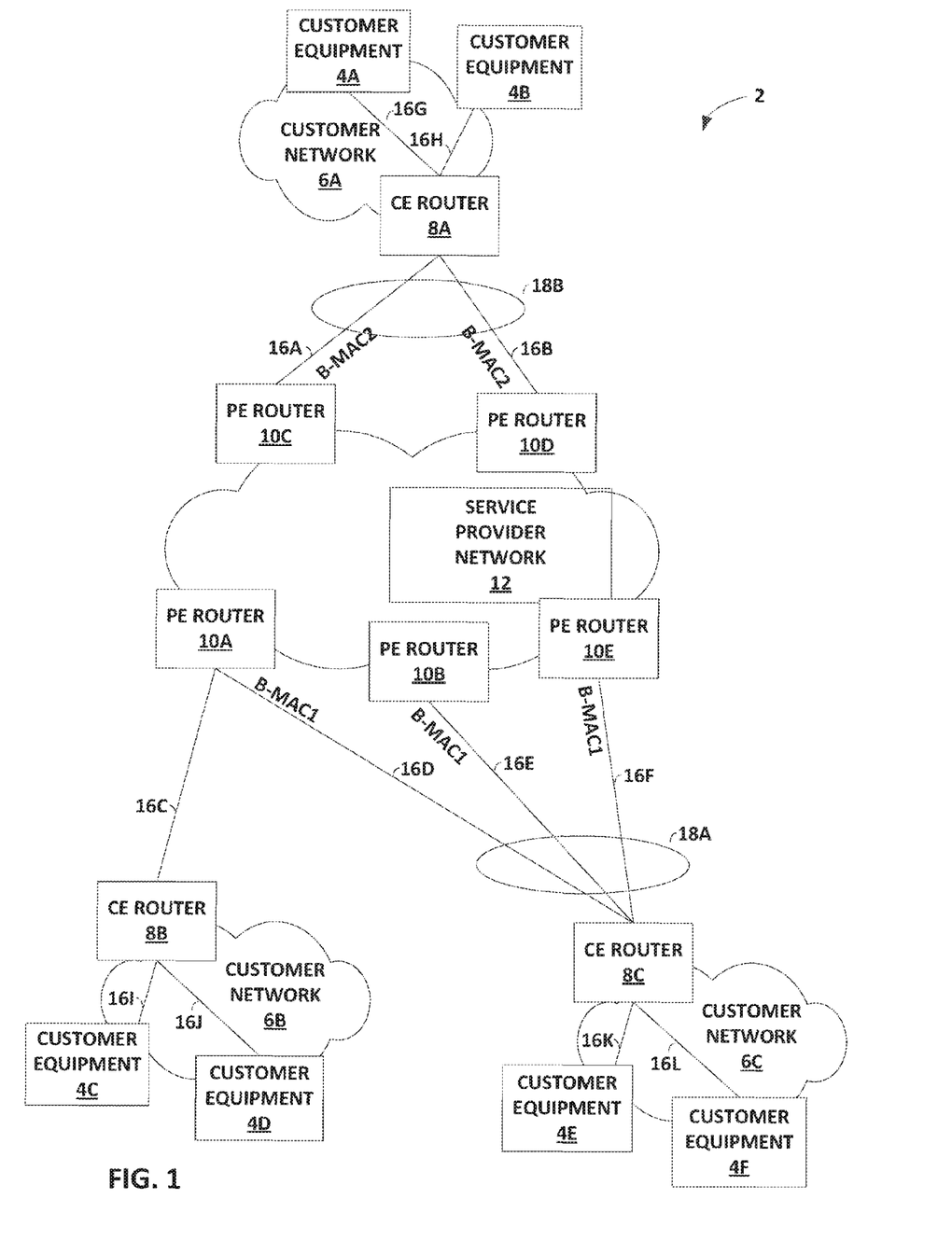
FIG. 1 is a block diagram illustrating an example PBB-EVPN in accordance with the techniques of the disclosure.

FIG. 1 is a block diagram illustrating an example PBB-EVPN in accordance with the techniques of the disclosure. In the example of FIG. 1, system 2 is a Provider Backbone Bridging Ethernet Virtual Private Network (PBB-EVPN). PE routers 10A-10E ("PE routers 10") provide customer equipment 4A-4F ("customer equipment 4") associated with customer networks 6A-6C ("customer networks 6") with access to service provider network 12 via CE routers 8A-8C ("CE routers 8"). Communication links 16A-16L may be Ethernet, ATM or any other suitable network connections.

PE routers 10 and CE routers 8 are illustrated as routers in the example of FIG. 1. However, techniques of the disclosure may be implemented using switches or other suitable network devices that participate in a layer two (L2) virtual private network service, such as a Provider Backbone Bridging Ethernet Virtual Private Network (PBB-EVPN). Customer networks 6 may be networks for geographically separated sites of an enterprise. Each of customer networks 6 may include additional customer equipment 4A-4F, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely an example. For example, an enterprise may include any number of customer networks 6. Nonetheless, for ease of description, only customer networks 6A-6C are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model Service provider network 12 is an L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes L2 EVPN service. For example, an EVPN is a service that provides a form of L2 connectivity across an intermediate L3 network, such as service provider network 12, to interconnect two L2 customer networks, such as L2 customer networks 6, that are usually located in two different geographic areas. Often, EVPN is transparent to the customer networks in that these customer networks are not aware of the intervening intermediate service provider network and instead act and operate as if these two customer networks were directly connected and formed a single L2 network. In a way, EVPN enables a form of a transparent LAN connection between two geographically distant customer sites that each operates a L2 network and, for this reason, EVPN may also be referred to as a "transparent LAN service." Additional example information with respect to the EVPN protocol is described in "BGP MPLS Based Ethernet VPN," draft-ietf-12vpn-evpn-11, Internet Engineering Task Force (IETF), Jul. 2, 2014, the entire contents of which are incorporated herein by reference.

To configure an EVPN, a network operator of the service provider configures various devices included within service provider network 12 that interface with L2 customer networks 6. The EVPN configuration may include an EVPN instance (EVI), which comprises one or more broadcast domains. Generally, an EVI may refer to a routing and forwarding instance on a PE router, such as PE routers 10A-10E. Consequently, multiple EVIs may be configured on PE routers 10 for an Ethernet segment, as further described herein, each providing a separate, logical layer two (L2) forwarding domain. In this way, multiple EVIs may be configured that each includes one or more of PE routers of an Ethernet segment. For example, Ethernet segment 18A may comprise a first EVI which includes PE routers 10A, 10B, and 10E, and a second EVI, which includes only PE routers 10A, 10B. In some examples, Ethernet Tags are then used to identify a particular broadcast domain, e.g., a VLAN, in an EVI. A PE router may advertise a unique EVPN label per <ESI, Ethernet Tag> combination. This label assignment methodology is referred to as a per <ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment.

In order to operate in an active-active Ethernet segment, for example, Ethernet segment 18A, an EVPN protocol executing on PE routers 10A, 10B, and 10E triggers EVPN designated forwarder (DF) election for Ethernet segment 18A. This may be accomplished, for example, by EVPN protocol executing on each of PE routers 10A, 10B, and 10E that participates in Ethernet segment 18A directing the router to output a routing protocol message advertising an Ethernet Segment Identifier (ESI), which is typically unique across all EVPN instances (EVIs).

FIG. 1 illustrates a PBB-EVPN environment that includes Ethernet segments 18A and 18B. In typical operation, PE routers 10A-10E communicate using the Border Gateway Protocol (BGP). PE routers 10 may interoperate using BGP in accordance with the techniques described in Provider Backbone Bridging Combined with Ethernet VPN (PBB-EVPN), draft-ietf-l2vpn-pbb-evpn-10, Nov. 14, 2015, the entire contents of which are incorporated herein by reference.

Figure 5:
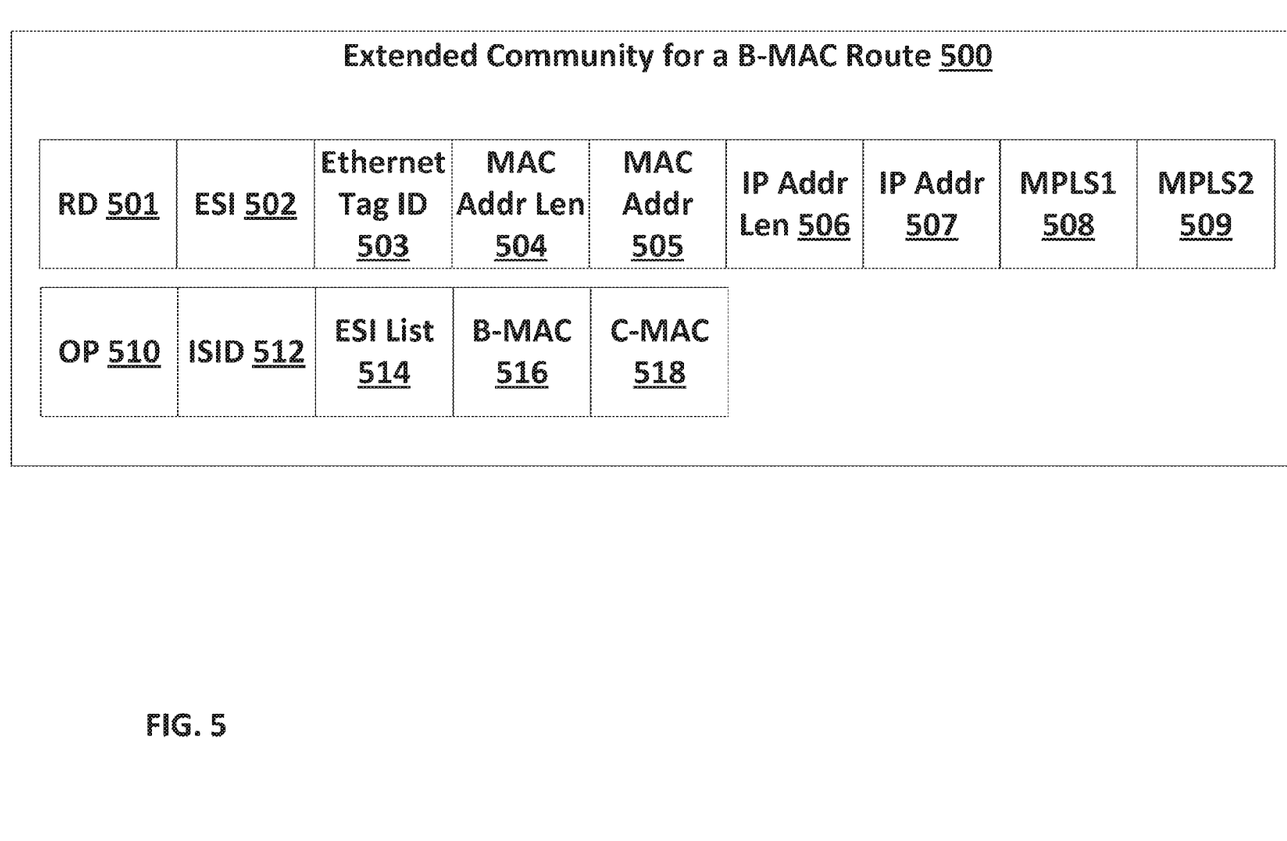
FIG. 5 is a block diagram illustrating an example extended community for a B-MAC route in accordance with the techniques of the disclosure.

An EVPN Ethernet Segment route advertised by each PE router 10A-10E using BGP includes a Route Distinguisher and Ethernet Segment Identifier. In a PBB-EVPN, MAC route advertisements are used to advertise B-MAC addresses, while C-MACs are stored only through data plane (L2) learning (e.g., MAC learning). Further, Ethernet Tag ID field 503 is set to 0. ESI field 502 may indicate whether the Ethernet segment is a single-homed or multi-homed segment. ESI field 502 must be set to either 0 (for single-homed segments or multi-homed segments with per-I-SID load-balancing) or to MAX-ESI (for multi-homed segments with per-flow load-balancing). The remaining fields function as described for an EVPN.

PBB-EVPN enables one or more routers to operate in single-active redundancy mode or all-active (e.g., active-active) redundancy mode. In single-active redundancy mode, only a single PE router, among a group of PE routers attached to an Ethernet segment, is allowed to forward traffic to/from that Ethernet Segment, then the Ethernet segment is defined to be operating in Single-Active redundancy mode. For instance, PE router 10B may be allowed to forward traffic to and from Ethernet Segment 18A. In all-active redundancy mode, all PE routers attached to an Ethernet Segment are allowed to forward traffic to/from that Ethernet Segment. For instance, in all-active redundancy mode, each of PE routers 10A, 10B, and 10E are allowed to forward traffic to and from Ethernet Segment 18A. As further described in this disclosure, when operating in all-active redundancy mode, one of PE routers 10A, 10B, or 10E in Ethernet Segment 18A may be elected as the designated forwarder to forward BUM traffic to and from Ethernet Segment 18I, while non-designated forwarders may drop such BUM traffic for Ethernet Segment 18A.

In an EVPN that does not utilize PBB, a PE router performs MAC learning of customer/client MAC (C-MAC) addresses and advertises the C-MACs in BGP MAC Advertisement Routes to other PE routers in the EVPN. Such BGP MAC Advertisement Routes indicate the reachability of the C-MACs via the PE router that advertised the BGP MAC Advertisement Routes. Therefore, in EVPN, all the PE routers participating in the same EVPN instance are exposed to all the C-MAC addresses learned by any one of these PE routers because a C-MAC learned by one of the PE routers is advertised to other PE routers in that EVPN instance. In network applications with millions of C-MAC addresses, this introduces a potential waste of PE router resources. As such, PBB-EVPN was introduced to confine the scope of visibility of C-MAC addresses to those PE routers that are actively involved in forwarding traffic to, or from, these addresses.

To reduce the number of BGP MAC Advertisement routes and the size of C-MAC tables, PBB-EVPN relies on a MAC summarization scheme, as is provided by PBB. In the MAC summarization scheme, network packets are forwarded through service provider network 12 by encapsulating network packets with source and destination Backbone MAC (B-MAC) addresses. PBB-EVPN defines a B-MAC address space of B-MAC addresses that are independent of a C-MAC address space, and aggregates C-MAC addresses via a single B-MAC address.

Each PE router may maintain a B-MAC forwarding table and a C-MAC address table for the respective address spaces. A PE router may build a B-MAC table that includes associations between B-MAC addresses and respective sets of PE router IP addresses that are associated with a particular Ethernet Segment. For instance, an entry or row in a B-MAC table of a PE router may include a B-MAC address and a set of identifiers (e.g., MAC or IP addresses) of PE routers in a particular Ethernet segment, where the PE router has configured the B-MAC address to correspond to the particular Ethernet Segment. Each PE router may be associated with an MPLS label that uniquely identifies the respective PE router, and the MPLS label may be associated with the respective identifier or entry in B-MAC table for respective PE router.

PE routers may be initially configured to associate a B-MAC address with a particular Ethernet segment. For instance, PE routers 10A, 10B, and 10E may each be configured in Ethernet segment 18A. To perform this configuration, PE routers 10A, 10B, and 10E may each store a mapping that represents an association between an identifier of Ethernet Segment 18A and a common B-MAC address (e.g., B-MAC1). As such, PE routers 10A, 10B, and 10E may encapsulate egress traffic forwarded into the service provider network 12 with B-MAC1 as the source B-MAC address.

In PBB-EVPN, PE routers learn remote C-MAC address to B-MAC address bindings in the data plane for traffic received from the core per-PBB bridging operation. For instance, PE routers initially advertise local B-MAC address reachability information in BGP to all other PE routers in the same set of service instances, but perform C-MAC address learning in the data plane (L2 learning). When advertising reachability, each PE router may advertise an MPLS label that identifies the respective PE router. As an example, if PE router 10A receives a network packet from customer network 6C, PE router 10A may perform C-MAC address learning to store an association, in the C-MAC table of PE router 10A, between B-MAC1 and the source C-MAC address of the network packet. PE router 10A may encapsulate the packet with B-MAC1 as the source B-MAC address and B-MAC2 as the destination B-MAC address, where B-MAC2 is associated with PE router 10C. PE router 10C, upon receiving the network packet may perform MAC learning based on the source C-MAC address included in the packet. If PE router 10C does not include an entry in its C-MAC table for the source C-MAC address, then PE router 10C may store an entry that includes an association between the source C-MAC address and B-MAC1.

At a later time, if PE router 10C receives a network packet from customer network 6A, PE router 10C may determine the destination C-MAC address for the packet matches the previously learned C-MAC address stored in C-MAC table of PE router 10A that is associated with B-MAC1. PE router 10A may encapsulate the packet with B-MAC2 as the source B-MAC address and B-MAC1 as the destination B-MAC address. To forward the network packet to Ethernet Segment 18A that corresponds to B-MAC1, PE router 10C performs a lookup in its B-MAC table. PE router 10C identifies an entry with B-MAC1 and selects an identifier of one of PE routers 10A, 10B, or 10E, which are each associated with B-MAC1 in the B-MAC table. If PE router 10C selects PE router 10A as PE router to forward the network packet to customer network 6C, PE router 10C includes the MPLS label for PE router 10A as part of the network packet header and forwards the network packet using its egress interface for PE router 10A. PE router 10A, upon receiving the network packet, performs a lookup in the C-MAC table based on the destination C-MAC address included in the network packet. Because PE router 10A previously learned the C-MAC address, PE router 10A forwards the network packet to customer network 6C using the interface for link 16D.

At configuration and startup, a PE router, such as PE router 10A performs a number of operations. For instance, PE router 10A discovers all remote PE routers for a PBB I-SID in which PE router 10A is included. PE router 10A, at configuration and startup, distributes B-MAC addresses to other PE routers in the PBB I-SID, so as to indicate PE router 10A is reachable via the B-MAC addresses, which may be associated with respective Ethernet Segments. PE router 10A, at configuration and startup, may also discover other PE routers in the same Ethernet Segment (e.g., PE routers 10B and 10E in Ethernet Segment 18A) and perform a designated forwarder (DF) election that is responsible for forwarding Broadcast, Unidentified Unicast or Multicast traffic (BUM) traffic for a given PBB I-SID, B-MAC address, and/or Ethernet Segment. In the example of FIG. 1, PE router 10A is elected the DF and PE routers 10B and 10E are elected non-DFs or backup-DFs. As such, PE router 10A may forward BUM traffic from service provider network 12 for BMAC-1, while PE routers 10B and 10E may not.

As shown in FIG. 1, CE routers 8 may be multi- and/or singly-homed to one or more of PE routers 10. In EVPN, a CE router may be said to be multi-homed when it is coupled to two physically different PE routers on the same EVI when the PE routers are resident on the same physical Ethernet Segment. As one example, CE router 8C is coupled to PE routers 10A, 10B, and 10E via links 16D-16F, respectively, where 10A, 10B, and 10E are capable of providing access to EVPN for L2 customer network 6C via CE router 8C. In instances where a given customer network (such as customer network 6C) may couple to service provider network 12 via two different and, to a certain extent, redundant links, the customer network may be referred to as being "multi-homed." In this example, CE router 8C may be multi-homed to PE routers 10A, 10B, and 10E because CE router 8C is coupled to two different PE routers PE routers 10A, 10B, and 10E via separate and, to a certain extent, redundant links 16D-16F where PE routers 10A, 10B, and 10E are each capable of providing access to EVPN for L2 customer network 6C. Multi-homed networks are often employed by network operators so as to improve access to EVPN provided by service provider network 12 should a failure in one of links 16D, 16E, and 16F occur. In a typical EVPN configuration, only the multi-homing PEs 10A, 10B, and 10E participate in DF election for each ESI. CE router 8B is single-homed to PE router 10A via communication link 16C.

In active-active mode configuration, remote PE 10C is typically configured to install the MAC routes for Ethernet segment 18A, such that traffic downstream traffic to customer network 6C is balanced between PE routers 10A, 10B, and 10E, which are each included in the Ethernet segment 18A. In the example PBB-EVPN of FIG. 1, PE routers 10A, 10B, and 10E may be configured in EVPN active-active mode, such that PE router 10C load-balances downstream network traffic to customer network 6C between PE routers 10A, 10B, and 10E.

A PBB-EVPN, load balancing may be performed for PE routers 10A, 10B, and 10E for traffic originating from customer network 6C. This load balancing may be performed to increase reliability of service provider network 12 to customer network 6C as well as reduce the load imposed by customer network 6C on a single PE router. While ideally the existence of PE routers 10A, 10B, and 10E on ESI 18A is transparent to customer network 6C, in some situations the customer network desires to perform the load balancing and selection of PE routers 10A, 10B, and 10E. However, because in a PBB-EVPN PE routers learn MAC addresses through the data plane, each of the PE routers in an Ethernet segment may create asymmetric C-MAC address tables, despite the desire for these PE routers to operate identically on the segment. Load balancing traffic in a PBB-EVPN may aggravate the problem of these asymmetric tables because PE routers with incomplete C-MAC routing tables are treated the same as PE routers with more complete C-MAC routing tables, thus creating inefficiencies in the network, such as increased BUM traffic, which consume valuable network resources.

An EVPN may operate over a Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using a MPLS protocol, each router along an LSP allocates a label and propagates the label to the closest upstream router along the path. Routers along the path add or remote the labels and perform other MPLS operations to forward the MPLS packets along the established path.

As shown in the example of FIG. 1, PE routers 10A-10E and provider router 18 may provide an MPLS core for sending network packets from customer network 6A to and from customer network 6C. Each of PE routers 10A-10E implement the MPLS protocol and apply one or more MPLS labels, i.e., a label stack, to network packets in accordance with routing and forwarding information configured at each respective PE router. As described above, PE router 10C may attach an MPLS label advertised by PE router 10A to a packet that PE router 10C is forwarding to PE router 10A, such that the packet is forwarded through service provider network 12 to PE router 10C.

A PBB-EVPN differs slightly from an EVPN in that a PBB-EVPN implements IEEE Backbone Edge Bridge (BEB) functionality in each PE router. Using PBB's MAC-in-MAC encapsulation, PBB-EVPN separates C-MAC edge namespaces from B-MAC address namespaces. In contrast to E-VPN, PBB-EVPN uses BGP within the IP/MPLS core to advertise B-MAC address reachability (e.g., PE router A to PE router B), while data plane learning is still used for remote C-MAC address to remote B-MAC binding (e.g., PE router A to CE router via PE router B). Generally speaking, in PBB-EVPN, each PE router receives an 802.1Q Ethernet frame from a CE router, encapsulates the frame in a PBB header, and forwards the frame over the IP/MPLS core using MPLS labels. Next, the PBB-encapsulated frame traverses the IP/MPLS core as described above for an EVPN network. On the egress EVPN PE router, the PBB header is removed following the MPLS disposition, and the original 802.1Q Ethernet frame is delivered to the destination CE router.

A PBB-EVPN requires several modifications to the PE router of an EVPN. In a PBB-EVPN, each PE router must learn customer/client C-MAC addresses over the attachment circuits in the data plane (L2 learning), per normal bridge operation. However, each PE router must also learn remote C-MAC to B-MAC bindings in the data plane for traffic received from the core per PBB bridging operation. Further, each PE router has a set of backbone MAC (B-MAC) addresses that uniquely identifies the device, and the PE router must advertise its local B-MAC address reachability information in BGP to all other PE routers within the PBB-EVPN. Finally, each PE router must receive BGP advertisements from remote PE routers, and use this information to build and maintain a forwarding table associating remote B-MAC addresses with remote PE IP addresses and the associated MPLS label(s). Further examples of the PBB implementation are provided by "IEEE Standard for Local and metropolitan area networks—Media Access Control (MAC) Bridges and Virtual Bridged Local Area Networks," Clauses 25 and 26, IEEE Std 802.1Q, DOI 10.1109/IEEESTD.2011.6009146, IEEE, the entire contents of which is incorporated herein by reference.

During startup, each PE router connected to the same Ethernet segment (e.g., as in a multi-homing configuration) may automatically discover other PE routers on the same segment. Each of these PE routers may elect a DF that is responsible for forwarding BUM traffic for a given PBB I-SID. Furthermore, each PE router may use EVPN BGP MAC advertisement routes to distribute reachability information for the B-MACs associated with the local Ethernet segments to which it belongs. As discussed above, after the initial EVPN route configuration, the PE router receives network traffic from a CE router and performs MAC learning of the traffic's origin C-MAC addresses. If the PE router knows the destination C-MAC address of the traffic, it forwards the traffic across the IP/MPLS core. If the destination is unknown, the PE router forwards the traffic as BUM traffic to all devices on the network.

While a PBB-EVPN provides numerous advantages in abstraction and data management over an EVPN, this abstraction can lead to an increase in unnecessary BUM traffic for remote multi-homed PE routers communicating with a single-homed PE router. With respect to FIG. 1, for example, PE routers 10A, 10B, and 10E comprise Ethernet segment 18A and elect PE router 10A as the DF. As an example, after some time operating, PE router 10A may learn the C-MAC address of customer equipment 4E through the data plane of PE router 10A, while PE router 10A may learn the C-MAC address of customer equipment 4D on customer network 6B through data plane. Supposing customer equipment 4R on customer network 6C sends network traffic to customer equipment 4D on customer network 6B, CE router 8C may forward the communication to service provider network 12 along Ethernet segment 18A. Customer network 6C may load balance the traffic to Ethernet segment 18A, causing, in some examples, approximately 33% of traffic originating from CE router 8C to be forwarded to PE router 10A, 33% to PE router 10B, and 33% to PE router 10E, although other load-balancing schemes may provide different distributions.

If PE router 10A receives the network traffic in its data plane, PE router 10A may send the network traffic as known unicast traffic the message directly to CE router 8B on customer network 6B because it previously has learned the C-MAC address for CE router 8B. However, if CE router 8C forwards the network traffic to PE routers 10B or 10E, these non-DF routers must forward the network traffic as a BUM message to all devices on the network because they have not previously learned the C-MAC address for customer equipment 4D. This may cause unnecessary flooding of BUM traffic into service provider network 12.

PE router 10A may receive the BUM traffic and forward the network traffic to customer equipment 4D via CE router 8B. When customer equipment 4D on customer network 6B sends return traffic to customer equipment 4E, CE router 8B may forward the message to PE router 10A. Because PE router 10A previously has learned the C-MAC address for CE router 8C, it may forward the message directly to CE router 8C. Thus, PE routers 10B and 10E may never receive network traffic from customer equipment 4D and may not learn its C-MAC address. Further, because PE router 10A is the DF, PE routers 10B and 10E may drop any BUM messages they receive. Thus, if PE router 10A forwards network traffic originating from customer equipment 4D, PE routers 10B and 10E may discard it and never learn the C-MAC addresses of devices on customer network 6B. Thus, for every network packet forwarded to customer equipment 4D that travels through PE routers 10B and 10E (66% in this example), PE routers 10B and 10E will forward the network packet as BUM traffic to every device on the network. This uses valuable network resources and may be inefficient, especially because PE router 10A, which is a member of the same Ethernet segment as PE router 10B and 10E, has learned the C-MAC address of CE router 8B and can unicast messages to it without tying up the network.

Accordingly, the routing tables of each PE router on an Ethernet segment may have knowledge of the reachability of C-MAC addresses by remote PE routers within the same Ethernet segment. Thus, the techniques according to the disclosure, a first PE router included in an Ethernet segment of a Provider-Backbone Bridging Ethernet Virtual Private Network (PBB-EVPN) may receive a first L2 data message from a first CE router, wherein an L2 data message is a message carrying a customer data payload. The first PE router may then perform L2 learning of a C-MAC address included in the first L2 data message.

Further, according to the techniques of the disclosure, the first PE router may send an L2 control message to at least one other PE router included in the Ethernet segment, wherein the L2 control message is a message exchanged between peers in a network for configuration of the network. The L2 control message may comprise the C-MAC address and a B-MAC address corresponding to the Ethernet Segment of the PBB-EVPN. Further, the L2 control message may cause the at least one other PE router to learn the reachability of the C-MAC address through the first PE router based at least in part on the correspondence of the B-MAC address to the Ethernet Segment. In some examples, the L2 control message may be an extended community for a MAC route.

In further examples, the first PE router may use BGP protocol to transmit the L2 control message to the at least one other PE router included in the Ethernet segment. In further examples, the L2 control message may have a route target automatically derived from the multi-homed ESI value for PE router 10A, such that the L2 control message is automatically imported by multi-homed PE routers configured with the same ESI value. In further examples, the L2 data message may identify the remote B-MAC behind which the remote C-MAC address is learned to enable the at least one other PE router to install the C-MAC address within the correct pseudo-interface representing the core connection to the first PE router. With respect to the example network of FIG. 1, PE router 10A may send an extended community for a B-MAC route to PE routers 10B and 10E informing them of the reachability of CE router 8B via PE router 10A.

Further, according to the techniques of this disclosure, the first PE router may receive a second L2 data message as unicast traffic from the at least one other PE router in the Ethernet Segment. The second L2 data message may include the C-MAC address of the origin of the first L2 control message, wherein the same address is the destination C-MAC address of the second L2 data message. Accordingly, the first PE router may forward the second L2 data message to the first CE router. With respect to the example network of FIG. 1, PE routers 10B and 10E may forward unicast traffic destined for CE router 8B to PE router 10A instead of issuing BUM traffic to the entire network.

The extended community according to the techniques herein may also provide for removing a C-MAC address from a PE router. For example, if the local PE router receives a B-MAC route indicating that a particular B-MAC has been withdrawn, then the local PE router may delete the learned C-MAC addresses associated with the withdrawn B-MAC. Further, if the local PE router receives an extended community for a B-MAC route with the "Delete" operand, then the local PE router may delete the C-MAC addresses indicated by the extended community. Further, if the configuration of a remote PE is deleted, for example, the ESI or ESI B-MAC of an Ethernet segment is reset, deleted, or changed, then the local PE router may delete the learned C-MAC addresses associated with the re-configured remote PE router.

Thus, the extended community for a B-MAC route described by this disclosure may remedy the problem described above, where incongruent traffic between a multi-homed CE router and a single-homed CE router on a PBB-EVPN generates excess BUM traffic by the PE routers remote from the single-homed CE router because these remote PE routers never learn the C-MAC addresses of customer equipment in customer network 6B. Because the routing tables of PE routers are built symmetrically, remote PE routers learn the reachability of remote C-MAC addresses within their Ethernet segment, and can send known unicast traffic through a local PE router instead of issuing BUM traffic. Thus, the amount of BUM traffic issued on a PBB-EVPN having a first client router multi-homed to an Ethernet segment and a second client router single-homed to a remote PE of the same Ethernet segment may be greatly reduced. The techniques of this disclosure may also ameliorate convergence problems as well. Example implementations of the extended community for a B-MAC route of the present disclosure are described in more detail below.

Figure 2:
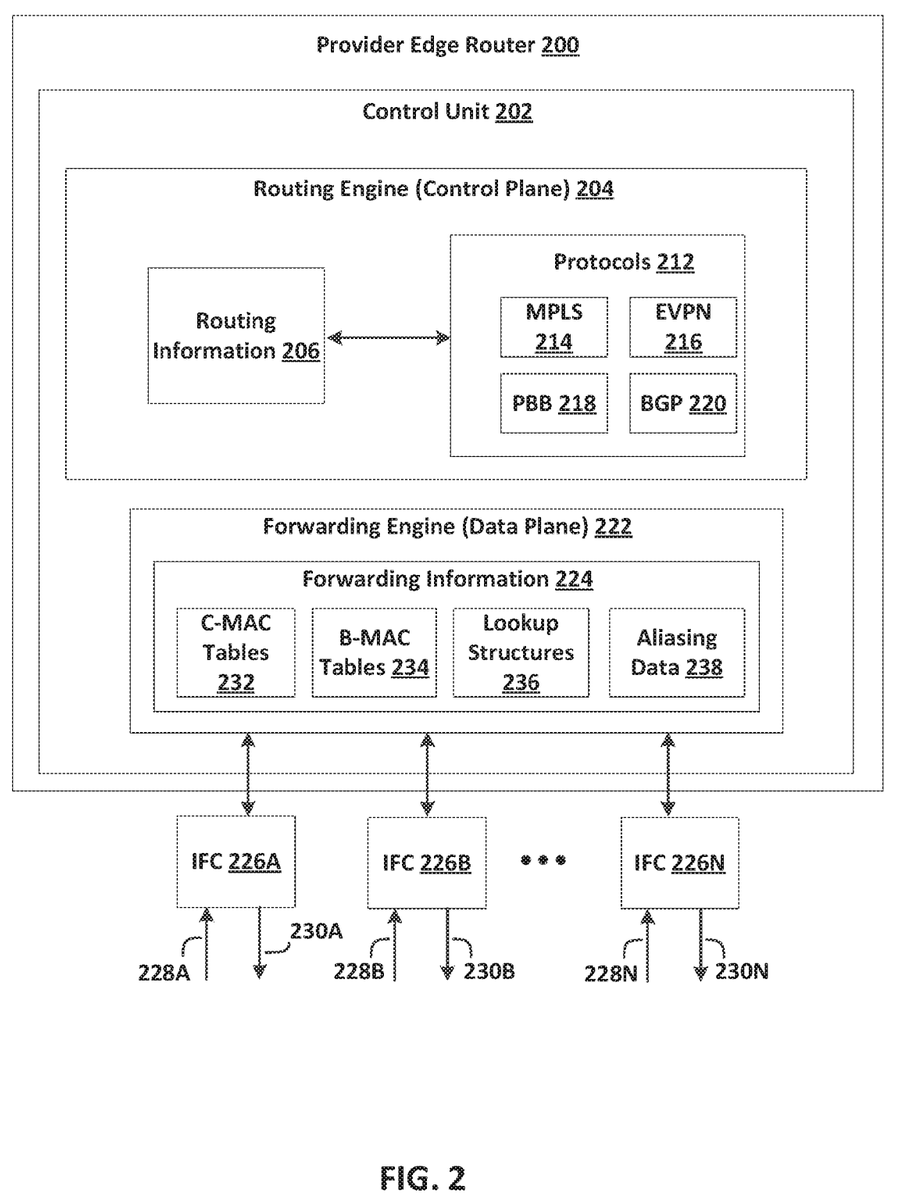
FIG. 2 is a block diagram illustrating an example provider edge router in accordance with the techniques of the disclosure.

FIG. 2 is a block diagram illustrating an example PE router within a PBB-EVPN in accordance with one or more techniques of the disclosure. In general, PE router 200 may operate substantially similar to PEs 10A-E of FIG. 1. In this example, PE router 200 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. PE router 200 also includes a control unit 202 that determines routes of received packets and forwards the packets accordingly via IFCs 226.

Control unit 202 may comprise a routing engine 204 and a packet forwarding engine 222. Routing engine 204 operates as the control plane for router 200 and includes an operating system that provides a multi-tasking operating environment for execution of a number of concurrent processes. Routing engine 204, for example, execute software instructions to implement one or more control plane networking protocols 212. For example, protocols 212 may include one or more routing protocols, such as Border Gateway Protocol (BGP) 220, for exchanging routing information with other routing devices and for updating routing information 206. Routing information 206 may describe a topology of the computer network in which PE router 200 resides, and may also include routes through the shared trees in the computer network. Routing information 206 describes various routes within the computer network, and the appropriate next hops for each route, i.e., the neighboring routing devices along each of the routes. Routing engine 204 analyzes stored routing information 206 and generates forwarding information 224 for forwarding engine 222. Forwarding information 224 may associate, for example, network destinations for certain multicast groups with specific next hops and corresponding IFCs 226 and physical output ports for output links 230. Forwarding information 224 may be a radix tree programmed into dedicated forwarding chips, a series of tables, a complex database, a link list, a radix tree, a database, a flat file, or various other data structures.

As shown in FIG. 2, forwarding information 224 includes B-MAC table 234. B-MAC table 234 includes data representing mappings or associations between B-MAC addresses and Ethernet segments. For instance, B-MAC table 234 includes a B-MAC address as key and a list of identifiers of PE routers included in an Ethernet Segment that corresponds to the B-MAC address. Forwarding information 224 also includes C-MAC table 232. C-MAC table 232 includes data representing mappings or associations between C-MAC addresses and B-MAC addresses. In some examples, C-MAC table 232 includes a C-MAC address as a key and a B-MAC address as the corresponding value, or vice versa. Forwarding information 224 may also include aliasing data 238. Aliasing data 238 may include data representing mappings or associations between B-MAC addresses and identifiers of Ethernet segments.

Forwarding information may also include lookup structures 236. Lookup structures 236 may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

In addition, routing engine 204 executes EVPN protocol 216, which operates to communicate with other routers to establish and maintain an EVPN, such as the PBB-EVPN of FIG. 1, for transporting L2 communications through an intermediate network so as to logically extend an Ethernet network through the intermediate network. EVPN protocol 216 may, for example, communicate with EVPN protocols executing on remote routers to establish pseudowires for the EVPN and maintain C-MAC address tables 232 associating L2 C-MAC addresses and B-MAC addresses with specific pseudowires. When implementing an EVPN, L2 MAC learning may be performed in the control plane by exchanging, with remote PE devices, BGP messages containing C-MAC addresses. EVPN protocol 216 communicates information recorded in C-MAC tables 232 and B-MAC tables 234 to forwarding engine 222 so as to configure forwarding information 224. In this way, forwarding engine 222 may be programmed with associations between each pseudowire and output interface and specific source C-MAC addresses reachable via those pseudowires. Additional example information with respect to the EVPN protocol is described in "BGP MPLS Based Ethernet VPN," draft-ietfl2vpn-evpn-11, Internet Engineering Task Force (IETF), Jul. 2, 2014, the entire contents of which are incorporated herein by reference.

In example embodiments, BGP 220 and EVPN 218 operate in accordance with the techniques described herein so as to advertise and/or receive Ethernet A-D per EVI routes that have been extended to carry the EVPN MH PE Status extended community data structure described herein. That is, responsive to instructions from EVPN protocol 216, BGP protocol 220 generates for output BGP Ethernet A-D per EVI routes specifying primary PE DF and backup DF for each {ESI, EVI}. Moreover, BGP 220 may similarly be configured to receive BGP Ethernet A-D per EVI routes specifying such information, and may extract such information and convey the elections to EVPN 216.

In example embodiments, PBB 218 and EVPN 216 may operate in accordance with the techniques described herein so as to encapsulate incoming GE router messages with a PBB header before using MPLS 214 to forward the message to an MPLS core. Further, PBB 218 and EVPN 216 may operate with MPLS 214 to receive messages from an MPLS core before removing a PBB header and forwarding the message to a CE router for delivery to a client device.

According to the techniques of this disclosure, the example PE router 200 may avoid traffic flooding due to asymmetric MAC learning within a PBB-EVPN Active-Active Ethernet Segment. For example, IFC 226A may receive a message from a CE router along one or more incoming links 228A-228N. IFC 226A may pass the received message to Forwarding Engine 222 for processing. Forwarding Engine 222 may store the destination C-MAC and at least a portion of the received message in Forwarding Information table 224. At least a portion of the received message may be passed to Routing Engine 204. Routing Engine 204 may parse the received message for the C-MAC address that indicates the origin of the message.

If Routing Engine 204 determines that the origin C-MAC address is not listed within C-MAC Tables 232, Routing Engine 204 may add the C-MAC address to C-MAC Table 232. If the C-MAC address is new, BGP protocol 204 may query B-MAC Tables 234 for a list of B-MAC addresses for known PE routers within the IP/MPLS core. BGP protocol 220 in conjunction with MPLS protocol 214 may generate an extended community for a B-MAC route containing the origin C-MAC address and transmit along outgoing links 230A-230N the extended community for a B-MAC route to each PE router specified by the B-MAC addresses of B-MAC Tables 234.

Routing Engine may search C-MAC Table 232 to determine a destination C-MAC address of the received message is reachable by PE router 200. If a C-MAC address is found, Forwarding Engine 222 may then transmit the received message along one of outgoing links 230A-230N of IFCs 226 to the destination C-MAC address using Forwarding Information 224. If the destination C-MAC address is not within C-MAC Table 232, Routing Engine 204 may search B-MAC Table 234 for a B-MAC address mapped to the destination C-MAC address. If a B-MAC address is found, PBB protocol 218 and MPLS 214 may operate to encapsulate the received message. Forwarding Engine 222 may then transmit the received message along one of outgoing links 230A-230N of IFCs 226 to the corresponding B-MAC address using Forwarding Information 224. If an address corresponding to the destination C-MAC address of the received message is not found within C-MAC tables 232 or B-MAC tables 234, then Forwarding Engine 222 may forward the received message to each address within C-MAC tables 232 and B-MAC tables 234 as BUM traffic.

The architecture of router 200 illustrated in FIG. 2 is shown for example purposes only. The techniques as set forth in this disclosure may be implemented in the example router of FIG. 2, as well as other types of routers not described specifically herein. In other examples, router 200 may be configured in a variety of ways. In one example, some of the functionally of control unit 202 may be distributed within IFCs 226. In another example, control unit 202 may comprise a plurality of packet forwarding engines operated as slave routers. Nothing in this disclosure should be construed so as to limit the techniques of this disclosure to the example architecture illustrated by FIG. 2.

Figure 3:
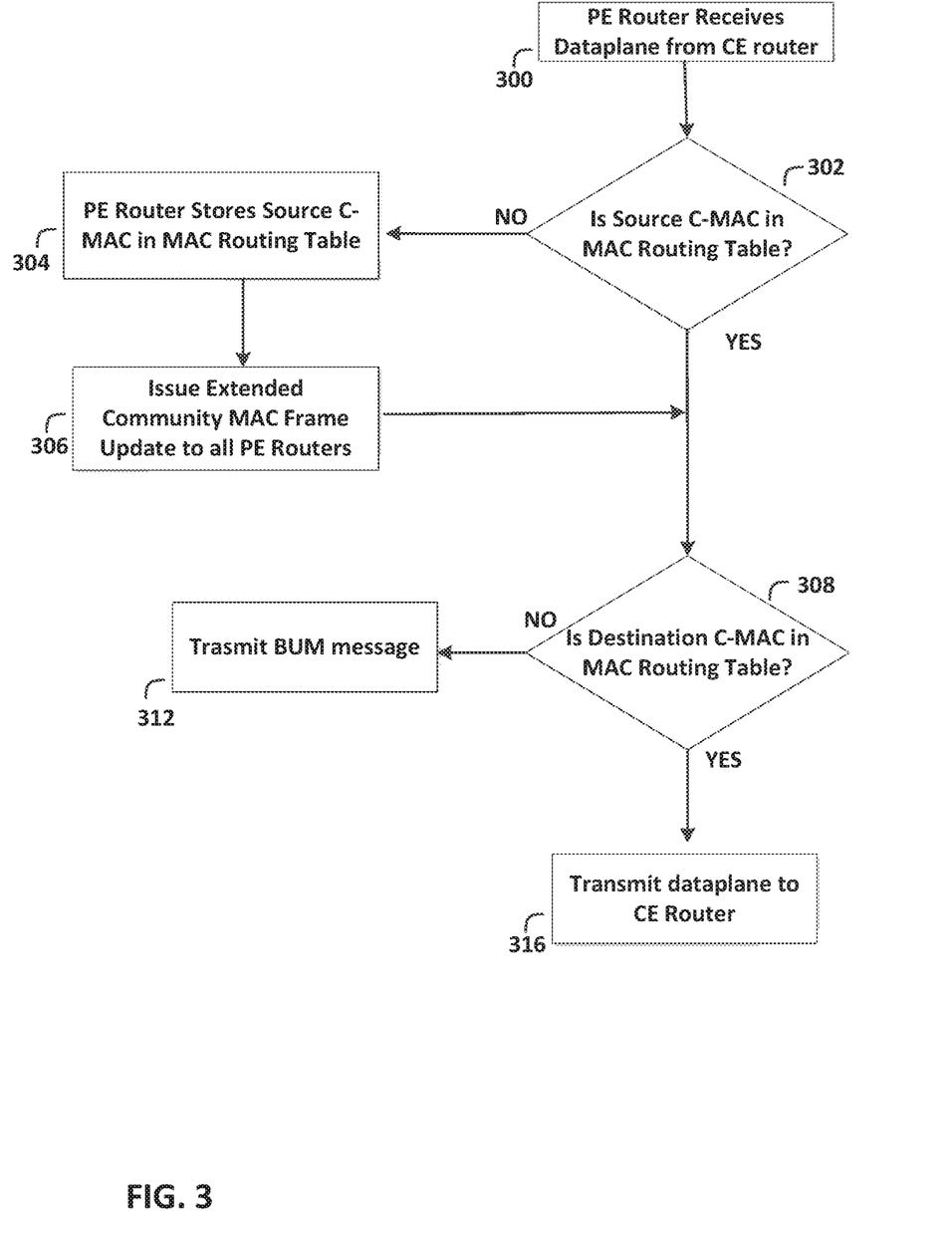
FIG. 3 is a flowchart illustrating an example provider edge router operation in accordance with the techniques of the disclosure.

FIG. 3 is a flowchart illustrating an example provider edge router operation in accordance with the techniques of the disclosure. Example operations in accordance with techniques of the disclosure are illustrated for example purposes with respect to PE router 10A as described in FIG. 1. According to the techniques of this disclosure, PE router 10A may receive a customer network packet from a CE router 10B (300). PE router 10A may determine whether the source C-MAC address of the customer network packet is included in PE router 10A's MAC Routing Table or C-MAC routing table (302). If not, PE router 10A may learn the C-MAC address by storing the source C-MAC address in its C-MAC Routing Tables (304). Further, PE router 10A may transmit an L2 control message, such as a B-MAC route, that includes an extended community as described in accordance with the techniques of this disclosure to one or more PE routers within the IP/MPLS core to inform the remote PE routers within its Ethernet segment of the reachability of the C-MAC address through the PE router via a source B-MAC that is included in the extended community (306).

PE router 10A may later receive a subsequent customer network packet from PE router 10E. PE router 10A may determine whether the destination C-MAC of the customer network packet is within the C-MAC Routing Tables of PE router 10A (308). The existence of the destination C-MAC within the C-MAC Routing Tables of PE router 10A indicates that the destination router is reachable by PE router 10A, for example, PE router 10A to CE outer 8B in FIG. 1. If the destination C-MAC of the customer network packet is within the C-MAC Routing Table of PE router 10A, then PE router 10A may transmit the customer network packet to the destination (316). Otherwise, PE router 10A may forward the network traffic as BUM traffic to all known PE and CE routers (312). In this way, it may be seen that an extended community for a B-MAC route according to the techniques of this disclosure may keep the routing tables of the PE routers within an Ethernet segment congruent. Because the routing tables are kept congruent, the BUM traffic issued by PE routers for a client router single-homed to a remote PE of the same Ethernet segment may be greatly reduced.

Figure 4:
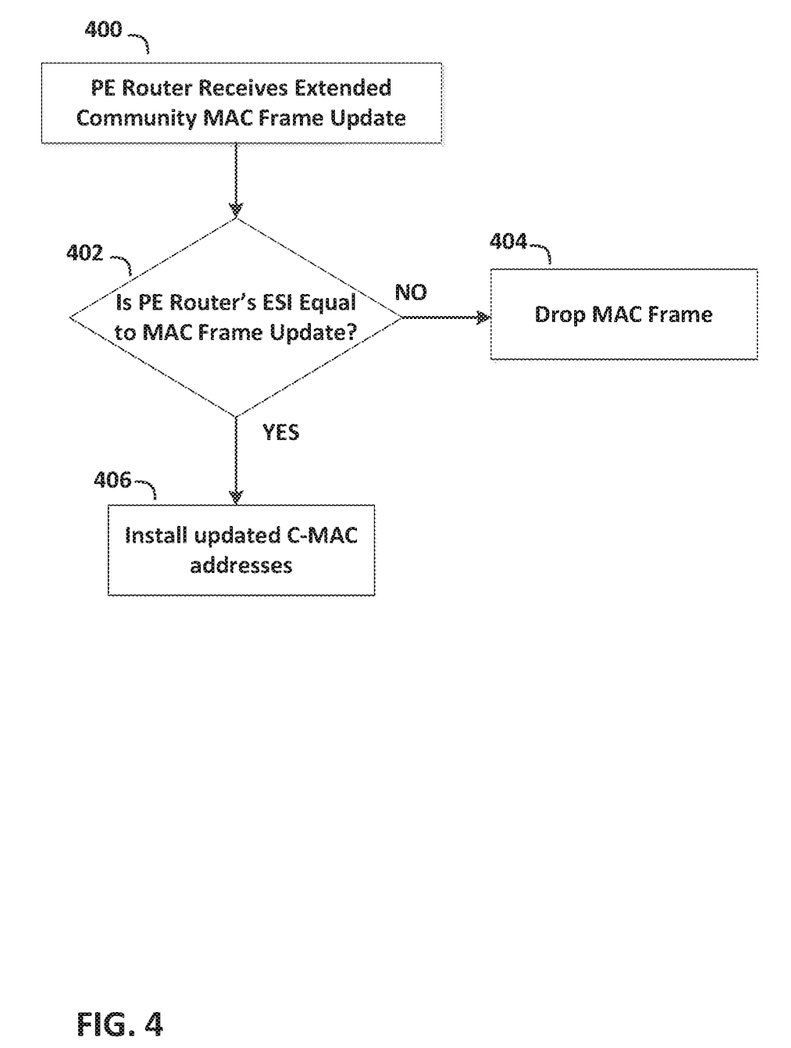
FIG. 4 is a flowchart illustrating an example provider edge router operation in accordance with the techniques of the disclosure.

FIG. 4 is a flowchart illustrating an example provider edge router operation in accordance with the techniques of the disclosure. Example operations in accordance with techniques of the disclosure are illustrated for example purposes with respect to PE router 10E as described in FIG. 1. PE router 10A may receive an extended community for a B-MAC route from a remote PE router (400). With respect to FIGS. 1 and 2, for example, PE router 10E may receive such an extended community for a B-MAC route along IFC 226 along incoming link 228 from PE router 10A. PE router 10E may examine Routing Information 206 to determine whether the ESI of the Ethernet segment of PE router 10E is equivalent to the ESI of the extended community for the B-MAC route (402). If the ESIs are not equivalent, PE router 10E may discard the extended community for the B-MAC route (404). In this case, the C-MAC addresses included in the extended community may not be installed by PE router 10E. For example, PE router 10C in FIG. 1 may discard an extended community for a B-MAC route received from RE router 10A because they are not within the same Ethernet segment. If the ESIs are equivalent, then the PE router may install the updated MAC addresses described in the extended community in its routing tables (406). For example, PE router 10E in FIG. 1 may install the MAC address described by an extended community for a B-MAC route received from PE router 10A describing the reachability of customer equipment 4C because both PE routers 10A and 10E are within the same Ethernet segment. With respect to FIGS. 1 and 2, Forwarding Engine 222 of PE router 10E may install the C-MAC address of customer equipment 4C within C-MAC tables 232 of Forwarding Information 224. Further, Forwarding Engine 222 of PE router 10E may install a B-MAC address associated with the IP address of PE router 10A within B-MAC Tables 234 of Forwarding Information 224. In some examples, Forwarding Engine 222 of PE router 10E may further cross-link or associate the B-MAC address associated with the IP address of PE router 10A with the C-MAC address of customer equipment 4C to indicate the reachability of customer equipment 4C via PE router 10A.

Thus, only those PE routers within the same Ethernet segment as the PE router issuing an extended community for a B-MAC route may install the C-MAC addresses described by that MAC frame update. In this way, PE routers in a PBB-EVPN may build routing tables that are congruent with the routing tables of other PE routers in the same Ethernet segment, while ignoring the C-MAC addresses outside of their Ethernet segment. Thus, the techniques according to this disclosure may greatly reduce the BUM traffic issued by PE routers for a client router single-homed to a remote PE of the same Ethernet segment within a PBB-EVPN. Further, the techniques of this disclosure avoid the scaling issues faced by an EVPN, where each PE router must track and manage every C-MAC known to the entire EVPN.

FIG. 5 is a block diagram illustrating an example extended community that may be attached to a B-MAC route in accordance with the techniques of the disclosure. A typical EVPN MAC route includes an RD field 501, an Ethernet Segment Identifier (ESI) field 502, an Ethernet Tag ID field 503, a MAC address length field 504, a MAC address field 505, an IP address length field 506, an IP address field 507, an MPLS Label1 field 508, and an MPLS Label2 field 509. RD field 501 comprises an IP address of the PE (typically, the loopback address), followed by a number unique to the PE router. ESI field 502 is set to the 10-octet ESI of the Ethernet segment and may indicate whether the Ethernet segment is a single-homed or multi-homed segment. Ethernet Tag ID field 503 may be zero or may represent a valid Ethernet Tag ID. MAC address length field 504 is in bits, and it is set to 48. MAC address field 505 specifies the C-MAC described by the MAC route. IP address field 507 is optional. By default, the IP address length field 506 is set to 0, and the IP Address field is omitted from the route. When a valid IP address needs to be advertised, it is then encoded in IP address field 507. When an IP address is present, IP address length field 506 is in bits, and it is set to 32 or 128 bits. MPLS Label1 field 508 is associated with the MAC address being advertised by the advertising PE The MPLS Label1 field is encoded as 3 octets, where the high-order 20 bits contain the label value. MPLS Label2 field 509 is an optional field. If it is present, then it is encoded as 3 octets, where the high-order 20 bits contain the label value.

In PBB-EVPN, MAC routes are used for B-MAC addresses. Therefore, PBB-EVPN MAC routes differ slightly from EVPN MAC routes. For example, in a PBB-EVPN, the MAC address field 505 contains the B-MAC address instead of a C-MAC address. Further, Ethernet Tag ID field 503 is set to 0. ESI field 502 may indicate whether the Ethernet segment is a single-homed or multi-homed segment. ESI field 502 may be set to either 0 (for single-homed segments or multi-homed segments with per-I-SID load-balancing) or to MAX-ESI (for multi-homed segments with per-flow load-balancing). All other values for ESI field 502 may not be permitted. The remaining fields function as described for an EVPN.

According to the techniques of this disclosure, the extended community includes several additional fields that may be prepended or appended to an L2 control message, such as a B-MAC route for a PBB-EVPN. For example, the extended community for a B-MAC route 500 includes OP field 510, ISID field 512, ESI list field 514, B-MAC address field 516, and C-MAC address 518. OP field 510 may be set to either the "Add" or "Delete" command. The "Add" command causes a PE router to add an entry into its MAC address routing table for a MAC address learned in a data plane. The "Delete" command causes a PE router to delete a MAC address from a MAC address routing table (e.g., in response to a MAC address ageout). ISID field 512 contains the service ID on which a single-homed, single-active, or heterogeneous Active-Active Ethernet segment provides service. ESI list 514 is a list of Active-Active Ethernet segments for a given service/ISID. This list of Ethernet Segment Identifiers (ESIs) may be used for importing and programming the Customer C-MAC reachability. The Ethernet Segment Identifier may be used for identifying a multi-homed segment in an EVPN or a PBB-EVPN. According to the techniques of the disclosure, in one example, ESI list 514 may be used for installing C-MAC addresses for remote PE routers configured for the same Ethernet segment. In this example, the extended community for a B-MAC route may be sent to all known PE routers, and those PE routers having an ESI within ESI list 514 may install the C-MAC addresses within the extended community, and those PE routers not having an ESI within ESI list 514 may ignore the extended community. B-MAC address field 516 describes the B-MAC address for a single-homed, single-active, or heterogeneous Active-Active Ethernet Segment device. The C-MAC address described in C-MAC address field 518 is reachable via this B-MAC address. C-MAC address field 518 describes the C-MAC address that has been learned in the data plane. For remote PEs, this C-MAC address is reachable via the B-MAC address contained within B-MAC address field 516. With reference to FIGS. 1 and 2 as an example, Routing Engine 204 may use information stored within the PE router, including forwarding information and learned MAC addresses, to build the extended community. For example, Routing Engine 204 of PE router 10A may select an operand 510, such as "Add" or "Delete," to be used in the extended community for adding or removing a C-MAC address from a remote PE router's C-MAC address tables. In further examples, Routing Engine 204 of PE router 10A may use Routing Information 206 to generate the ISID of Ethernet segment 18A (514) and list of ESIs associated with PE router 10A (514) of the extended community. In further examples, Routing Engine 204 of PE router 10A may use Forwarding Information 224, such as C-MAC tables 232 and B-MAC tables 234, to provide values for a B-MAC address associated with PE router 10A (516) and a C-MAC address associated with customer device 4C (518) for use in the extended community. Routing Engine 204 may use BGP protocol 220 to append or prepend the extended community to an L2 control message, such as a B-MAC route. PE router 10A may transmit the L2 control message, which includes the extended community, to PE router 10E along outgoing links 230 of IFC 226.

Routing Engine 204 may prepend or append the extended community to the B-MAC route to create a single L2 control message. Forwarding Engine 222 may forward the extended community and B-MAC route to a remote PE router in the Ethernet segment along outgoing link 230 of IFC 226.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
in response to receiving a first layer two (L2) data message, by a first provider edge (PE) router included in an Ethernet segment of a Provider-Backbone Bridging Ethernet Virtual Private Network (PBB-EVPN) and from a first customer edge (CE) router, performing L2 learning of a Customer MAC (C-MAC) address included in the first L2 data message;
sending, by the first PE router and to at least one other PE router included in the Ethernet segment, an L2 control message, the L2 control message comprising the C-MAC address and a first Bridging MAC (B-MAC) address that is not configured at the at least one other PE router, the L2 control message causing the at least one other PE router to learn the reachability of the C-MAC address through the first B-MAC address of the first PE router based at least in part on the first PE router and the at least one other PE router each being configured for a second B-MAC address associated with the Ethernet segment; and
in response to receiving, by the first PE router and from the at least one other PE router in the Ethernet segment, a second L2 data message as unicast traffic that includes the C-MAC address, forwarding the second L2 data message to the first CE router.

2. The method of claim 1, wherein the at least one other PE router is not associated with the first B-MAC address, wherein the first PE router and the first CE router are each associated with the second B-MAC address.

3. The method of claim 2, wherein the first PE router and the at least one other PE router are each configured with a common Ethernet Segment Identifier that is associated with the first B-MAC address.

4. The method of claim 1, wherein the L2 control message includes an extended community, wherein the extended community comprises:
the C-MAC address;
the first B-MAC address;
an operand that indicates an addition or deletion operation for the C-MAC address at the at least one other PE router;
a service instance identifier (ISID) indicating a service instance that includes the first B-MAC address; and
a list of Ethernet segment identifiers (ESIs).

5. The method of claim 1, wherein the C-MAC address indicates a source of the first L2 data message.

6. The method of claim 1, wherein the first B-MAC address is a source B-MAC address, and wherein the performing L2 learning further comprises:
   determining whether the C-MAC address is within a MAC routing table of the first PE router; and
   installing the C-MAC address in association with the first B-MAC address within the MAC routing table upon determining that the C-MAC address is not within the MAC routing table.

7. The method of claim 1, further comprising:
   retrieving the C-MAC address from a C-MAC table of the first PE router, wherein the C-MAC address corresponds to a source of the first L2 data message;
   retrieving, based at least in part on the C-MAC address, the first B-MAC address from the C-MAC table; and
   generating the L2 control message with an extended community that comprises the C-MAC address and the first B-MAC address.

8. A first provider edge (PE) router of a Provider Backbone Bridging (PBB) Ethernet Virtual Private Network (EVPN), the first router comprising:
   a control unit having at least one processor coupled to a memory, wherein the control unit executes software configured to:
   in response to receiving a first layer two (L2) data message from a first customer edge (CE) router, perform L2 learning of a Customer MAC (C-MAC) address included in the first L2 data message;
   send to at least one other PE router included in the Ethernet segment, an L2 control message, the L2 control message comprising the C-MAC address and a first Bridging MAC (B-MAC) address that is not configured at the at least one other PE router, the L2 control message causing the at least one other PE router to learn the reachability of the C-MAC address through the first B-MAC address of the first PE router based at least in part on the first PE router and the at least one other PE router each being configured for a second B-MAC address associated with the Ethernet segment; and
   in response to receiving from the at least one other PE router in the Ethernet segment, a second L2 data message as unicast traffic that includes the C-MAC address, forward the second L2 data message to the first CE router.

9. The PE router of claim 8, wherein the at least one other PE router is not associated with the first B-MAC address, wherein the first PE router and the first CE router are each associated with the second B-MAC address.

10. The PE router of claim 9, wherein the first PE router and the at least one other PE router are each configured with a common Ethernet Segment Identifier that is associated with the first B-MAC address.

11. The PE router of claim 8, wherein the L2 control message includes an extended community, wherein the extended community comprises:
   the C-MAC address;
   the first B-MAC address;
   an operand that indicates an addition or deletion operation for the C-MAC address at the at least one other PE router;
   a service instance identifier (ISID) indicating a service instance that includes the first B-MAC address; and
   a list of Ethernet segment identifiers (ESIs).

12. The PE router of claim 8, wherein the C-MAC address indicates a source of the first L2 data message.

13. The PE router of claim 8, wherein the first B-MAC address is a source B-MAC address, and wherein the software configured to perform L2 learning is further configured to:
   determine whether the C-MAC address is within a MAC routing table of the first PE router; and
   install the C-MAC address in association with the first B-MAC address within the MAC routing table upon determining that the C-MAC address is not within the MAC routing table.

14. The PE router of claim 8, wherein the software is further configured to:
   retrieve the C-MAC address from a C-MAC table of the first PE router, wherein the C-MAC address corresponds to a source of the first L2 data message;
   retrieve, based at least in part on the C-MAC address, the first B-MAC address from the C-MAC table; and
   generate the L2 control message with an extended community that comprises the C-MAC address and the first B-MAC address.

15. A non-tranitory computer-readable medium comprising instructions for causing at least one programmable processor of a first provider edge (PE) router of a Provider Backbone Bridging (PBB) Ethernet Virtual Private Network (EVPN) to:
   in response to receiving a first layer two (L2) data message from a first customer edge (CE) router, perform L2 learning of a Customer MAC (C-MAC) address included in the first L2 data message;
   send to at least one other PE router included in the Ethernet segment, an L2 control message, the L2 control message comprising the C-MAC address and a first Bridging MAC (B-MAC) address that is not configured at the at least one other PE router, the L2 control message causing the at least one other PE router to learn the reachability of the C-MAC address through the first B-MAC address of the first PE router based at least in part on the first PE router and the at least one other PE router each being configured for a second B-MAC address associated with the Ethernet segment; and
   in response to receiving from the at least one other PE router in the Ethernet segment, a second L2 data message as unicast traffic that includes the C-MAC address, forward the second L2 data message to the first CE router.

16. The computer-readable medium of claim 15, wherein the at least one other PE router is not associated with the first B-MAC address, wherein the first PE router and the first CE router are each associated with the second B-MAC address.

17. The computer-readable medium of claim 16, wherein the first PE router and the at least one other PE router are each configured with a common Ethernet Segment Identifier that is associated with the first B-MAC address.

18. The computer-readable medium of claim 15, wherein the L2 control message includes an extended community, wherein the extended community comprises:
   the C-MAC address;
   the first B-MAC address;
   an operand that indicates an addition or deletion operation for the C-MAC address at the at least one other PE router;
   a service instance identifier (ISID) indicating a service instance that includes the first B-MAC address; and
   a list of Ethernet segment identifiers (ESIs).

19. The computer-readable medium of claim 15, wherein the first B-MAC address is a source B-MAC address, and wherein the instructions for causing the at least one programmable processor of the first PE router to perform L2 learning are further configured to cause the at least one programmable process of the first PE router to:
- determine whether the C-MAC address is within a MAC routing table of the first PE router; and
- install the C-MAC address in association with the first B-MAC address within the MAC routing table upon determining that the C-MAC address is not within the MAC routing table.

20. The computer-readable medium of claim 15, wherein the instructions are further configured to cause the at least one programmable processor of the first PE router to:
- retrieve the C-MAC address from a C-MAC table of the first PE router, wherein the C-MAC address corresponds to a source of the first L2 data message;
- retrieve, based at least in part on the C-MAC address, the first B-MAC address from the C-MAC table; and
- generate the L2 control message with an extended community that comprises the C-MAC address and the first B-MAC address.

\* \* \* \* \*